United States Patent [19]

Woithe et al.

[11] Patent Number: 4,720,799

[45] Date of Patent: Jan. 19, 1988

[54] HYDROLOGIC DATA ACQUISITION SYSTEM

[76] Inventors: Stanley D. Woithe; Peter J. Dillon, both of North Terrace, Adelaide, Australia, 5000

[21] Appl. No.: 746,603

[22] Filed: Jun. 19, 1985

[51] Int. Cl.⁴ .................. G01F 23/00; G06F 15/20
[52] U.S. Cl. ................................ 364/509; 364/550; 346/33 R
[58] Field of Search ............... 364/550, 509, 571; 346/33 R, 150

[56] References Cited

U.S. PATENT DOCUMENTS

| | | | |
|---|---|---|---|
| 4,229,798 | 10/1980 | Rosie et al. | 364/571 |
| 4,249,186 | 2/1981 | Edwards | 364/550 |
| 4,313,114 | 4/1984 | Lee et al. | 340/870.23 |
| 4,471,656 | 9/1984 | Sanders et al. | 364/509 |
| 4,476,535 | 10/1984 | Loshing et al. | 364/550 |
| 4,516,213 | 5/1985 | Gidden | 346/33 R |
| 4,595,932 | 6/1986 | Ruhl | 346/33 R |

FOREIGN PATENT DOCUMENTS 3144992  5/1983  Fed. Rep. of Germany .... 346/33 R

Primary Examiner—Felix D. Gruber
Assistant Examiner—Brian M. Mattson
Attorney, Agent, or Firm—Townsend and Townsend

[57] ABSTRACT

An apparatus records fluid level movement using a potentiometer that is rotated by a tape attached to a float and a counterweight. The output from the potentiometer is recorded by a microprocessor which is presettable for desired time intervals. Static friction in the moving parts causes small fluid displacement to go unrecorded until they accumulate to produce a larger rotation of the potentiometer, resulting in inaccurate data recording termed "staircasing." To overcome staircasing, before a reading is taken, an impactor made up of a solenoid with a spring-loaded core impacts the tape with sufficient magnitude such that the resultant movement and oscillation of the tape will overcome the static friction, resulting in a smooth, accurate data record.

7 Claims, 11 Drawing Figures

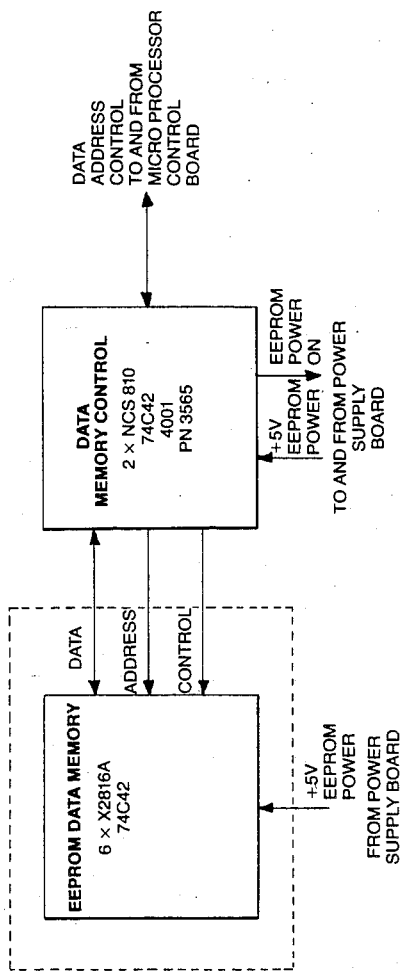

HYDROLOGIC DATA ACQUISITION SYSTEM

FIELD OF THE INVENTION

This invention relates to a data acquisition system useable for hydrological applications, for example for measuring water level variations in bore holes and streams. It further relates to a device which, with the necessary changes being made, can be used for other recording, for example, traffic monitoring.

BACKGROUND OF THE INVENTION

At the present time hydrological data is obtained with a pen and chart recorder, a trace being formed across the chart while there is relative rotation. Static friction in the moving parts normally results in a jerking discontinuous movement of the pen which creates a trace having a "staircase" configuration that is thereby inaccurate. In addition to this the chart is necessarily an analogue trace, the data of which requires convertion and input into a computer for analysis, which is a tedious and expensive manual operation.

In prior art hydrological data acquisition systems, it is known to make use of a float carried on the lower end of a perforate stainless steel tape which passes over a pulley having spaced protrusions that engage the perforations. Beneath that pulley is a jockey pulley, over which the tape passes, the other end of the tape terminating in a counter weight which counter balances the weight of the float.

The problem that exists with such floats, especially when used in small diameter bores, is that they do not faithfully follow the rise and fall of the water level. This is due to providing only a minimal buoyancy force when using a small float. The solution is to use a larger float, but this is not possible in many applications. When using a small float, the water level may rise minimally and therefore not provide sufficient uplifting force to overcome static friction in the moving parts. When the float does rise, it will do so by a significant amount that is not representative of the water level increase, causing a "staircase" readout on the chart recorder. Therefore small changes in water level will not be recorded.

One of the requirements of a data acquisition system is that it should be reliable and capable of being left unattended for an extended period of time, preferably some weeks. Quite frequently it will be required to be used where there is no mains power available, but can rely upon battery power for its energizing.

One of the objects of this invention is to provide a method of recording electrical signals from a transducer for the purpose of data acquisition wherein the accuracy of the data acquisition is improved. Another object of the invention is to provide a data acquisition system in which the power consumption is small.

SUMMARY OF THE INVENTION

The present invention is an apparatus for measuring and recording fluid levels by transmitting electrical signals from a transducer. The transducer includes a potentiometer, a master pulley which rests on and is connected to the potentiometer so that when the master pulley turns, a shaft of the potentiometer also turns by a proportional angular displacement and varies the electrical resistance of the potentiometer. The master pulley is engaged to a tape by means of protrusions through perforations in the tape. The tape has at one end a float placed in the fluid to be measured, and at the other end a counterweight. Thus when the float changes position in response to fluid level changes, the tape causes the master pulley to rotate which in turn causes the potentiometer to rotate and produce a proportional electrical signal. In measuring small changes in fluid level, however, the displacement of small floats is often insufficient to overcome static friction in the moving parts of the apparatus resulting in an accumulation of small displacements being recorded as one larger displacement, a phenomenon termed "staircasing." The present invention solves this problem of inaccurate data recording through use of an impactor, which is a solenoid with a spring-loaded core. Prior to a reading the core impacts the tape with sufficient effect to overcome the static friction and prevent staircasing. A microprocessor, presettable for desired time intervals between readings, interrogates the transducer and transfers measuring signals to a solid state memory device.

With this arrangement the microprocessor can be switched off during the initial storage of the signals in the transducer interface, and this makes it possible for reliable data acquisition to occur over an extended period of time. However there are other advantages in the invention, and these include relatively low cost and the inherent reliability of solid state devices.

A further understanding of the nature and advantages of the present invention may be realized by reference to the remaining portions of this application and the attached drawings.

BRIEF DESCRIPTION OF THE DRAWINGS

FIGS. 10 and 11 are block diagrams similar to those of FIGS. 3 and 6 respectively, for the recorder unit of FIG. 9.

DESCRIPTION OF THE PREFERRED EMBODIMENT

TRANSDUCER (FIG. 2)

The recording system will accept analogue or digital signals from an unlimited variety of transducers. It is capable of measuring environmental parameters such as water level, pressure, temperature or perform counting functions such as road traffic monitoring.

Figure 2:
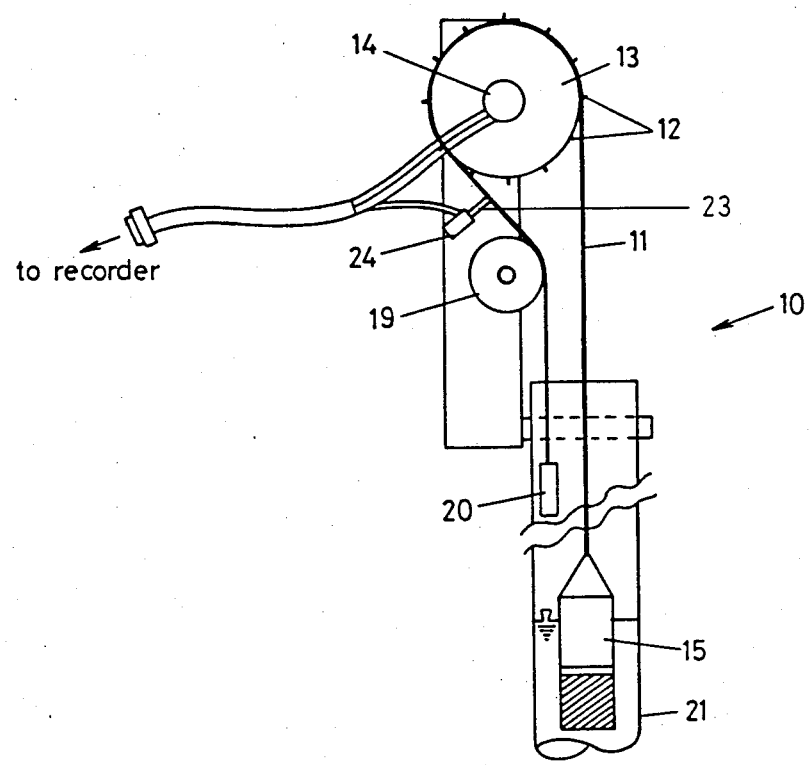
FIG. 2 is a diagrammatic drawing showing a transducer used for hydrologic data acquisition.

FIG. 2 illustrates transducer 10 for monitoring ground levels in small diameter bores. It satisfies two main requirements to reduce costs of monitoring and to improve the accuracy of the record with respect to prior art.

A punched stainless steel tape 11 engages protrusions 12 on the master pulley 13 which is directly coupled to a 10 turn potentiometer 14. A rise in water level raises float 15 attached to the tape 11 causing the master pulley 13 to rotate thereby turning the shaft of the potentiometer 14 which varies its electrical resistance. It is the voltage across the terminals of the potentiometer 14 which is read as input to digital recorder 18. A jockey pulley 19 is used to direct a counterweight 20 down the casing 21 of a bore in which water levels are being recorded. For measurement in wells and larger water bodies this is not required. An impactor 23 consists of a solenoid 24 with a spring-mounted steel and plastic composite core (not shown). Prior to readings being taken, current is passed through the solenoid 24 to accelerate the core which impacts the tape 11. The impact is sufficient to overcome static friction on the pulley bearings and frees the record of "staircasing", which is otherwise a problem when float sizes have to be restricted. Most of the time there is no current in the potentiometer nor in the impactor, thereby reducing the power requirement.

Where water levels are measured in large diameter bores or stilling wells, large diameter floats may be used to eliminate the need for an impactor. However, the impactor floats as small as 50 mm diameter to continuously give water levels within 1 mm of their true value under static and dynamic tests. The transducer has a range of 3750 mm with a resolution of 1 mm and is linear to within 2 mm over the full range. Tests have shown that the transducer output is insensitive over the range 0°-50°. The range of the transducer may be increased by either the use of a larger diameter pulley with a consequent reduction in resolution, or substituting the 10 turn potentiometer by a 25 turn potentiometer.

Reference is now made to the block diagrams:

RECORDER (FIG. 1)

The recorder unit consists of a metal box containing five standard size printed circuit boards. These boards are
1. Power supply (FIG. 3)
2. Microprocessor control (FIG. 4)
3. Transducer interface (FIG. 5)
4. Solid state memory (FIG. 6), and
5. Keyboard-display unit (FIG. 7).

The serial output of the microprocessor control feeds a computer with which is interfaced a line printer, as described below.

All components of the recorder are readily available. The elements of the recorder are shown separately, and these form a modular assembly.

This enables the recorder to be used for a range of applications by simply replacing, for example, the transducer interface board. Secondly it provided the simplest means of debugging and testing.

The power requirements of the circuit boards are a major constraint on the utility of the recorder. Therefore each of the five boards was designed to minimise its power consumption and thereby prolong battery life.

The power supply board (FIG. 3) is more complex than most prior art devices due to the design constraint to minimize the power requirements of all the boards. The power source is an 8 amp hour 12 volt sealed lead-acid rechargeable battery which provides ample power for at least 8 weeks operation at one minute resolution. For longer term operation at the same resolution additional batteries or solar recharging are required. Performance of the system is maintained for a battery voltage variation between 16 volts and 11.5 volts. In addition to providing the necessary regulated voltages, the power supply board also contains the components to activate the impactor 23.

The power supply board produces a number of independent regulated supplies as follows:

+5 volt control power. The supply from regulator 28 remains on all the time and powers a block, microprocessor switch on control and the CMOS read and write memory. During the standby period, the total current drain from the battery to keep the recorder alive comes from this supply, and is typically less than one milliamp. A standard integrated circuit regulator (such as a type 7805) is not used in this supply, because it has an operating current of about 5 milliamps. Instead a discrete component regulator is used where the operating current has been reduced to about 600 microamps. It uses two PN3565 transistors, one PN4355 transistor and a lower power precision regulator type LM336-2.5.

+5 volt microprocessor unit (MPU) switched power. The regulator 29 is switched on by switch 30, by the CMOS clock at the occurrence of the system time interval (STI), using the "upon" line. When the MPU has done what it has to do, it goes back into "standby" by switching off this supply. However, this supply will remain on if the keyboard-display unit (FIG. 7) is found to be switched to the active state. The current drain from the battery from this supply is about 75 milliamps, but is only on for about 5 milliseconds each STI. In operation, the "UPON" or "KA" signals turns on transistor switch 30 which applies 12 volts from the battery directly to regulator 29, which is a type 7805 integrated circuit 5 volt regulator.

+5 volt analog-digital convertor (A/D) switched power. Supply regulator 31 can only be switched on by program control, after the MPU itself has been turned on. It uses a transistor switch 32, this time controlled by the "A/D POWER ON" line 33, and is a standard type 7805 regulator.

−5 volt analog - digital converter (A/D) switched power. Supply for the inverter and regulator 34 will be switched on at the same time as regulator 31 by the "A/D power on" line 33. It uses a type 74C14 CMOS device and two transistors (type PN4355 and PN3643) in an oscillator circuit, which is used by a standard voltage doubler rectifier circuit to generate an output of about −11 volts. The −11 volts is applied to a type 7905 negative regulator to produce the required output voltage of −5 volts.

+5 volts switched EPROM power. Supply line 35 will be turned on by the microprocessor control board whenever access to the EPROM data memory module is required, both for the storing as well as the retrieving of data. The "EPROM power on" line 35 is used for this function and will turn on a transistor switch 36 when high. This applies +12 volts to another type 7805 regulator 37 to produce the required +5 volt out.

+21 volt switched EPROM power. The +21 volt supply line 41 is only required when data is to be stored in the data memory module. It is however switched on at the same time as supply line 35, but can only be applied to the data memory module after the VPPH line 42 from the solid state memory board goes high. The +21 volts is generated using the same oscillator circuit as in the −5 volt supply (above), but this time a voltage trippler rectifier circuit is used to produce about +30 volts. The final output of +21 volts is then obtained by the use of a type LM317 regulator 43.

The components necessary to activate the impactor 23 are also mounted on the power supply board. The "impactor on" line 44 from the microprocessor control board turns on a transistor switch 45 capable of supplying two amps of current at 12 volts to the impactor solenoid 24. Usually a 10 millisecond pulse is all that is necessary to operate the impactor, and this fact is used in the choice of some of the components. It means that the output transistor does not require a heat-sink, and its base drive resistor can be rated at less than half a watt. The impactor circuit is protected from the effects of a solenoid short circuit by the one amp fuse 46 in the main +12 volt battery line. Hence no other damage is likely to occur to the recorder from this type of fault.

The microprocessor control board (FIG. 4) controls the operation of the whole recorder. It is made up of the following four parts:

Crystal controlled clock 50. This consists of a one-Megahertz crystal oscillator and four type 4518 dividers which produce either a one second or ten second system time interval (STI) (selectable by a wiring link) for the microprocessor 51. Other timing signals such as a two millisecond reset pulse to energize the microprocessor 51 are also generated by this crystal controlled clock, together the one Megahertz microprocessor operating frequency. This part of the microprocessor control board has the +5 volt control power applied all the time the recorder is in operation.

Microprocessor control circuit 52. This uses the STI and reset pulse from the crystal controlled clock to:
(a) switch on the +5 volt MPU power supply, and,
(b) energise the microprocessor 51 itself.

When the microprocessor has finished doing what it has to do, the microprocessor control 52 will cause switch 30 to switch off the +5 volt MPU power (and hence the microprocessor itself) by responding to the switch off signal generated by the microprocessor. Several standard CMOS logic intergrated circuits and a type 4013 flip-flop, are used in the microprocessor control circuit 52. Like the crystal controlled block 50, it has the +5 volt control power applied all the time that the recorder is in operation.

CMOS read and write memory 54. When the recorder is first turned on, all the user selectable recorder parameters are stored in the CMOS read and write memory 54. The keyboard-display unit (FIG. 7) may be used to select these parameters, or default values may be selected by simply leaving the keyboard-display unit switch off. The main parameters stored in the CMOS read and write memory are:
(a) time of day clock and date which is updated each time the microprocessor is switched on by the crystal controlled clock timing pulse;
(b) amount of time between the gathering of data values for storing in the Data EPROM Memory (can be set between 1 second and 24 hours for a one second clock timing pulse); and
(c) a pointer to keep track of where the next data value may be stored in the data EPROM memory.

The CMOS read and write memory 54 consists of a CMOS type HM6116 integrated circuit and two CMOS logic gates, all of which are supplied with +5 volts control power. The logic gates are used to lockout the CMOS read and write memory during the time the microprocessor is switched off.

The microprocessor 51. This consists of a type NSC800 microprocessor unit, a type NSC831 input-/output device, a read only memory device (which contains the operating programme) and several other logic devices for address decoding and read/write control. Although all these devices are low power CMOS, their total active current is about 75 milliamps, which means that switching them off when they are not needed, results in a considerable extension of the battery life. The operating program in the read only memory, an ultraviolet erasable and electrically programmable (EPROM) device, can be changed by simply replacing or reprogramming it. This means that that the recorder can be changed from the ground water monitoring role to the traffic counting role by replacing the operating programme EPROM (27C32, item 51, FIG. 4) and the transducer interface board (FIG. 5).

Figure 5:
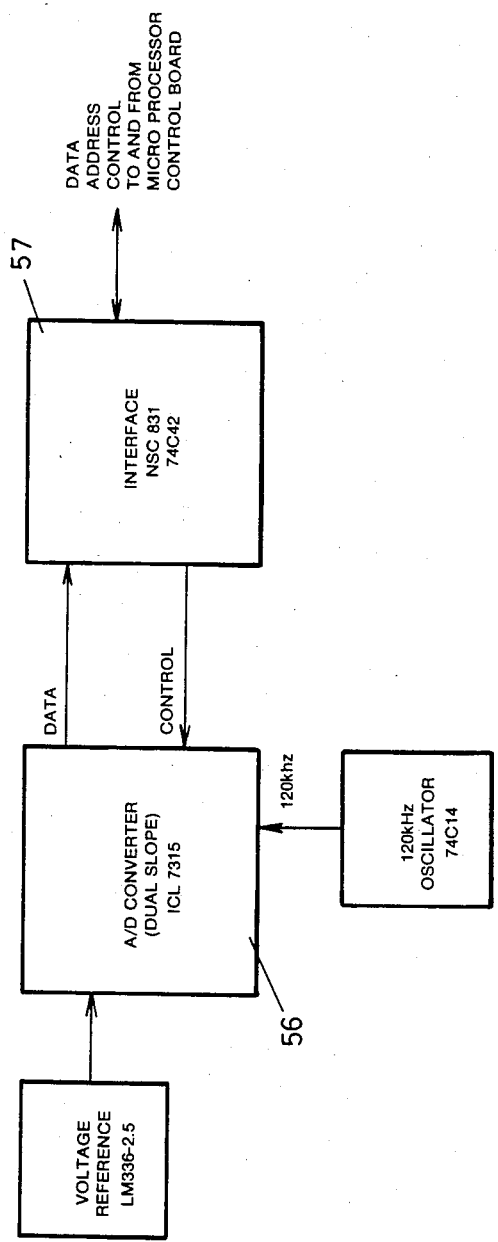
FIG. 5 is a block diagram of the transducer interface board.

Transducer interface board (FIG. 5). This board is used to interface the water level transducer 10 with the recorder. This contains a scaling potentiometer which enables very fast calibration of the transducer 10. Hence different diameter pulleys can be used depending on the choice of range and resolution required. The analogue voltage from the transducer potentiometer 14 is converted to a digital signal by the use of a type ICL7135 four and a half digit single chip analog to digital (A/D) converter 56. It is then transferred to the microprocessor control board via a NSC831 input/output interface device 57. At all times the interface device 57 remains under the control of the microprocessor control board, and can only become functional after the A/D power supplies (+5 volts and −5 volts) are switched on.

This board is replaced should the recorder be used for monitoring traffic, say, instead of water levels. Replacement entails only sliding one board out of its frame and inserting the new board.

Figure 6:
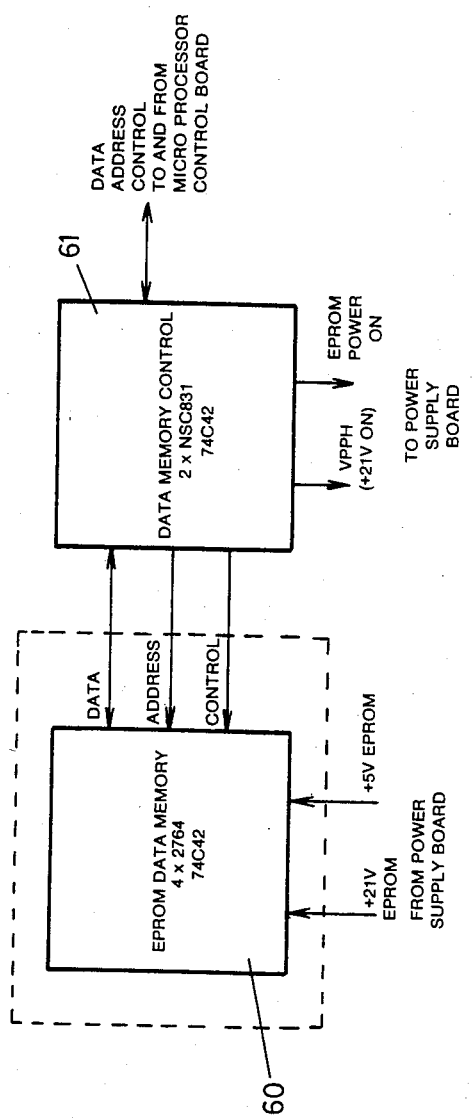
FIG. 6 is a block diagram of the solid state memory board.
Figure 7:
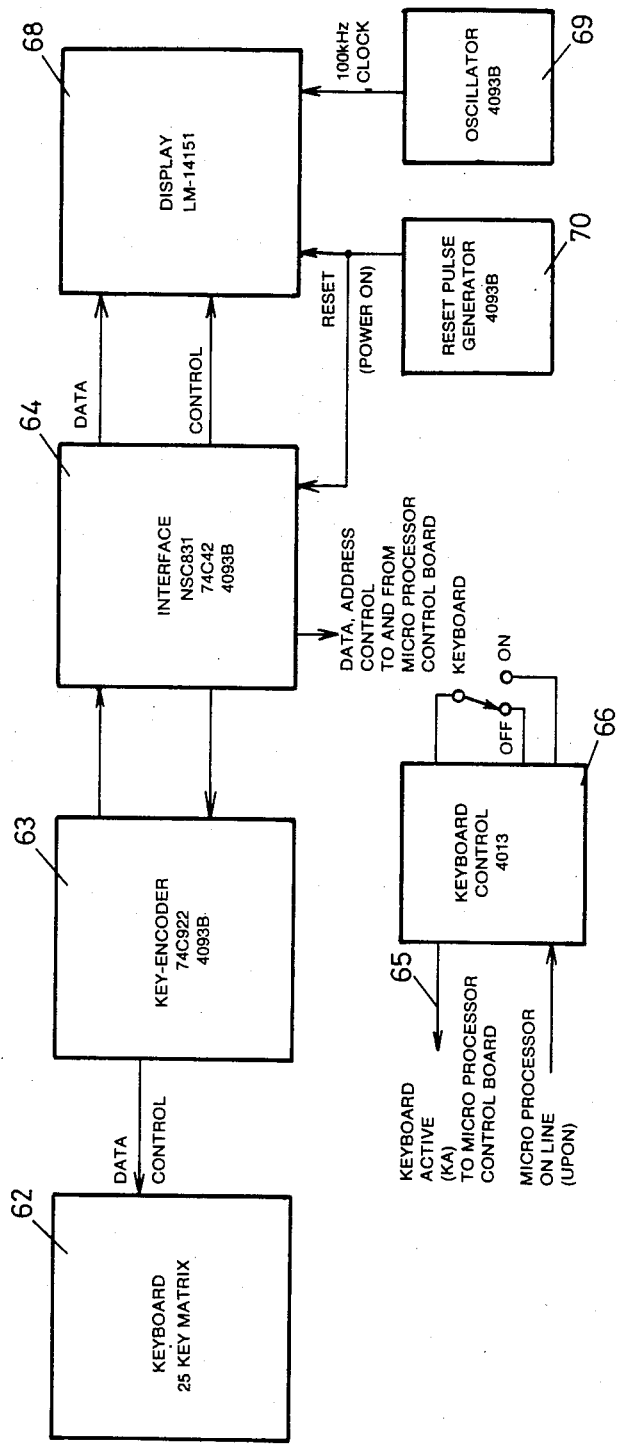
FIG. 7 is a block diagram of keyboard display unit.

Solid state memory board (FIG. 6). This board contains an EPROM data memory bank 60 of four semiconductor solid state memory chips (EPROMS) mounted in a detachable module. Each of these chips can store 2,000 pairs of time and date value readings (8,000 bytes). Thus a total of 8,000 pairs of readings can be stored in a module. Provision has been made to allow larger storage capacity chips to be inserted into the module to increase its capacity from 8,000 pairs of readings to 16,000 to 32,000, or even 64,000 pairs of readings.

The EPROMS modules are erasable using strong ultraviolet light. The covers on the modules must be removed before this can be done, which means that accidental erasure is highly improbable. Two modules are required for each recorder so that one can be brought in for replaying and erasing while the other has its turn in the recorder.

The time reading is stored as an eight digit decimal number. The data values are stored as four digit decimal numbers.

The main part of the solid state memory board consists of a cradle to hold the removable module and a data memory control 61 comprising two type NSC831 input/output devices for interfacing the module to the microprocessor control board. Control signals from the memory board are used by the power supply board to turn on the +5 volt EPROM power, and if a reading is going to be stored, turn on the +21 volt EPROM power as well. Like the transducer interface board, the solid state memory board can only be active while the microprocessor itself is functioning.

Keyboard-display unit board (FIG. 7) is not essential for recorder operation. However, if one is fitted to the recorder, then the recorder operating parameters can be changed in the field. As well as this the time of day clock and date may be set to the current year, month, day, hour and minute. This will allow the time and date to be stored in the data memory at the start and end of the recording session along with the station identifier and current data value. However without the keyboard-display unit, the recorder automatically stores "zeros" for the start time, and the elapse number of days, hours, minutes and seconds at the end of the recording session.

The keyboard-display unit plugs into the recorder, and in the standby state, displays the time and date. This is updated after each system time interval (STI) which is usually set to an interval of one second. The keyboard-display unit may be switched to the active state at any time without effecting the operation of the recorder. In this state however, the power consumption is considerably increased, because the microprocessor unit remains on. Therefore it is essential that the keyboard-display unit be switched back to the standby state before leaving the recorder.

There are two main parts to the keyboard-display unit, namely the keyboard part and the display part. Both these parts will now be discussed separately.

Keyboard 62. This consists of a matrix of 25 keys, a type 74C922 key encoder 63, and some standard CMOS logic devices, all driven from the +5 volt control power. The output from the encoder is interfaced to the microprocessor board via an NSC831 input/output interface device 64. Any keys that are pressed on the keyboard will not be recognised by the microprocessor unless the keyboard-display unit is switched to the active state. This is achieved by the "keyboard active" (KA) line 65 going high after the microprocessor is turned on, provided the switch is in the active state. A type 4013 25 flipflop keyboard control 66 is used to carry out this function.

Display. The display 68 consists of the same NSC831 that is used to interface the keyboard, and an LM-14151 14 digit dot matrix liquid crystal display (LCD) unit. A type 4093B Schmitt trigger two input quad NAND gate is also used, and performs such functions as the display oscillator 69 and the reset pulse generator 70. The display remains active even when the keyboard is not ("keyboard active" line low) and this allows the microprocessor to display the current date and time after each system time interval (STI). The power requirements of the display are negligible so leaving the display plugged in all the time has virtually no effect on battery life.

Figure 1:
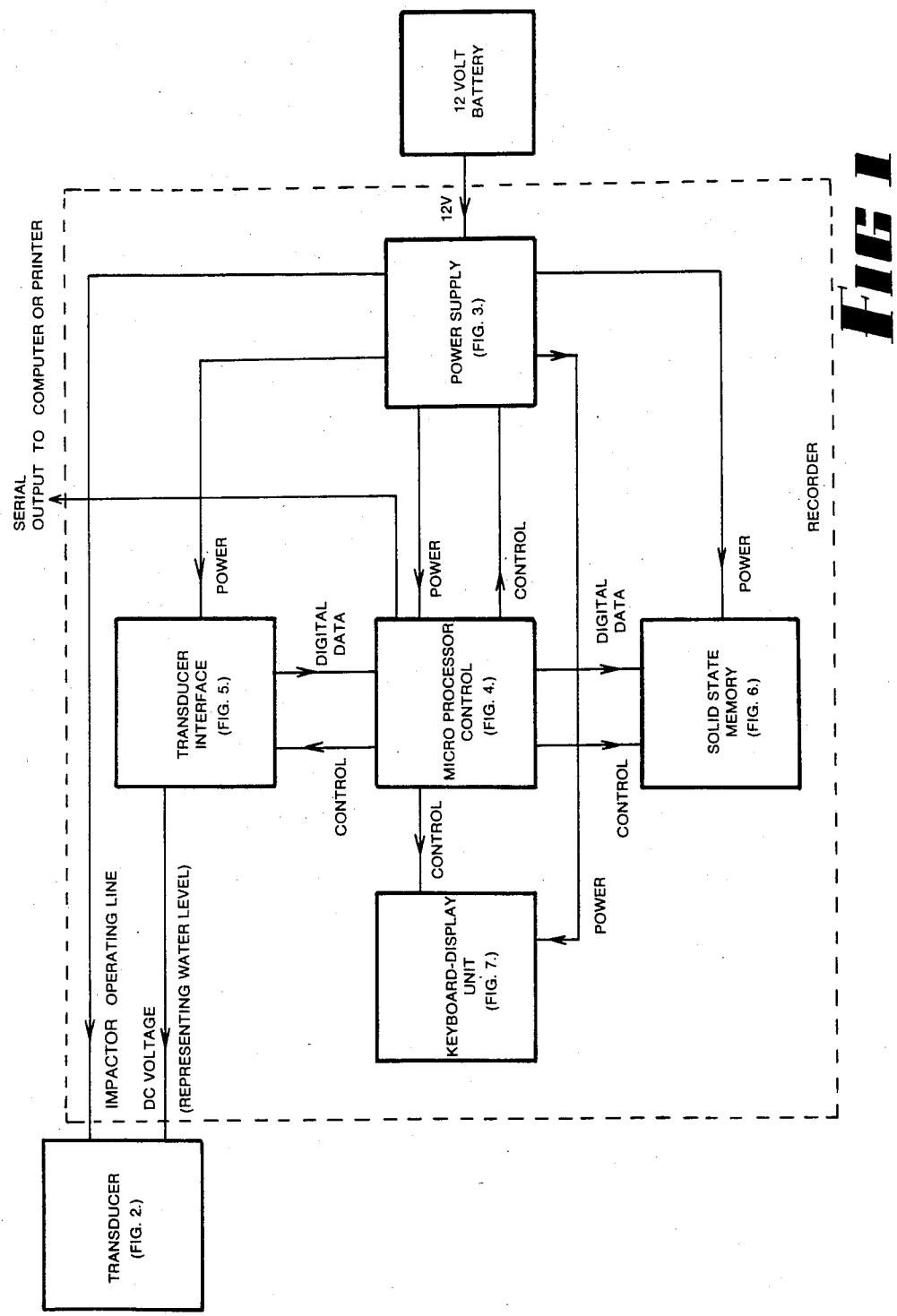
FIG. 1 is an overall block diagram of the electrical circuit which indicates the major sub-circuits and their representations according to a first embodiment.

Reader. Two methods of reading the date from the EPROM memory module are provided. The first of these is built into the recorder and makes use of the keyboard-display unit of FIG. 7. By pressing the "data display" function key (not shown), the contents of the data memory module can be placed on the display, one value at a time. This can be used in the field to test for correct operation of the recorder. The full contents of the data memory module can also be outputted to a portable printer in the field by making use of the serial output line 75 provided, and the "serial out" function key (not shown). The serial output line 75 could be used for reading the contents of the data memory modules at a centre location into a mainline computer or a printer, but requires the use of a complete recorder as shown in FIG. 1 (but without the transducer interface), which could otherwise be used in the field. The speed of this built-in serial output line can be set to either 110, 300, 1200, 2400 or 4800 bits per second by changing one of the locations in the operating program EPROM, but a small modification to the operating program could easily make this speed selectable from the keyboard-display unit.

The second method of reading the data memory modules does not require the use of a data recorder and hence is the preferred method for feeding the contents of the data memory modules into a central computer and/or printer (not shown). This reader is powered by the mains and has facilities to feed the data from an EPROM solid state data memory into any computer with an RS232C interface (20 mA current loop optional). The computer can be used for memory and analysis purposes. The speed of transfer can be set to either 110, 300, 1200, 2400, 4800, or 9600 bits per second (Bauds) by a dual in line rocker switch assembly. The main components of the reader are a 6802 microprocessor, a 6850 serial receiver/transmitter, two 6821 input/output devices, a 2716 EPROM, and the ancillary logic circuits required to perform frequency division and decoding. Another function of this reader is to test that the data memory modules have been correctly erased before sending them back to the field. This is a simple "go" "no go" test, and does not require the reader to be connected to the computer to be carried out.

The printer can be any printer with an RS232C interface, for example a Model 2752A printer manufactured by TELETYPE CORP., U.S.A. Such a printer can be plugged directly into the reader (method 1) or into the recorder (method 2).

Memory Eraser (not shown). Ultraviolet EPROM erasers are commercially available items, and one of these is used to erase up to three memory modules at once. Most of them use the Philips type TUV15W "germicidal" ultraviolet tube which is also readily available. Erasure takes approximately 30 minutes. The reader is used to check that each board is completely erased. The EPROM board is then ready for re-use in the recorder.

Battery Charger (not shown). A battery charger has been designed to enable sealed lead-acid batteries to be charged at the maximum recommended rate of the manufacturer without overcharging and gassing. Hence, with this charger the likelihood of a hydrogen explosion, which can occur when lead-acid batteries are overcharged, is minimized. The maximum charging rate of this battery charger is 2 amps and is therefore able to fully charge a flat 12 volt 8 amp-hour battery in less than 6 hours. When the battery is fully charged, the charger automatically goes into the "trickle charge state", and may remain in this condition indefinitely because no harm to the battery will result.

When the battery is connected to this charger and the power turned on, the present state of charge of the battery is sensed, and the current electronically adjusted to suit.

The battery may be left connected to the charger indefinitely because once the battery is fully charged the current drops down to a value (typically less than 100 milliamps) which will not cause damage. All this does is successfully maintain the battery in a fully charged condition.

Figure 8:
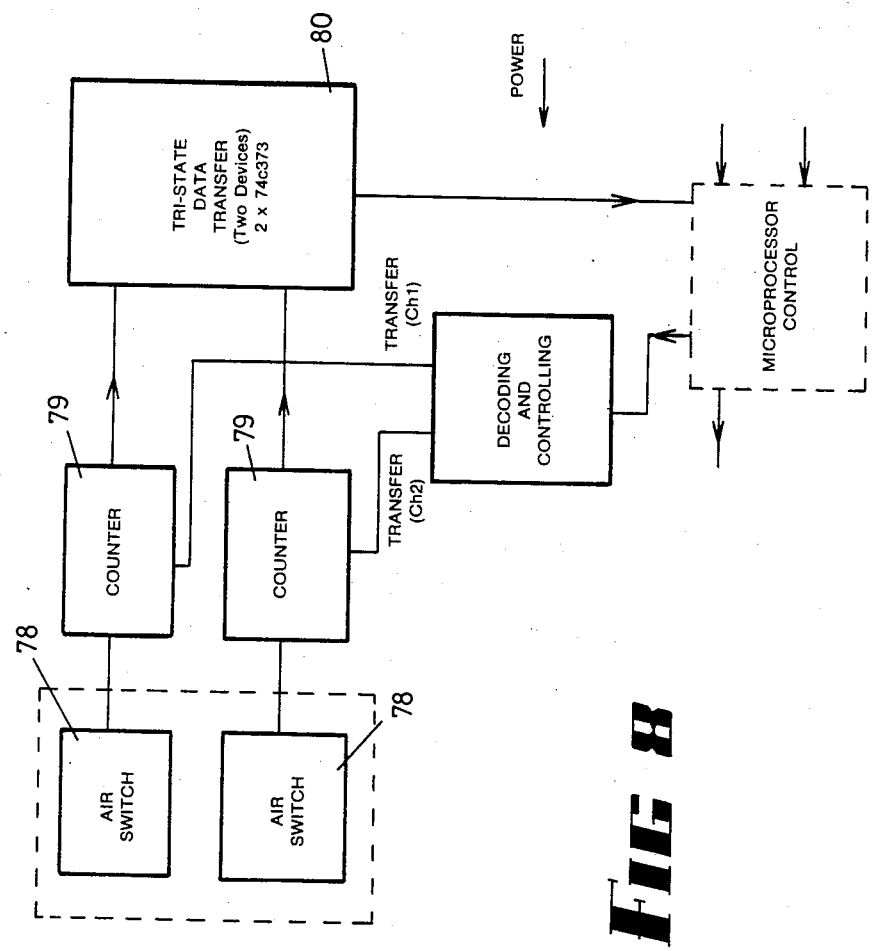
FIG. 8 is a block diagram showing modifications for a second embodiment wherein the recorder records data from the traffic monitor.

The above embodiment relates to use of the device in a hydrological data acquisition system. Minor changes are sometimes necessary when the device is used for other purposes, and the following is a description of changes required when the device is used for traffic monitoring purposes. FIG. 8 illustrates the change of devices, and may be compared with FIG. 1. The transducer (FIG. 2) and transducer interface (FIG. 5) are replaced in FIG. 1 by the arrangement of FIG. 8, but otherwise FIG. 1 is unchanged except for changing the operating programme EPROM on the microprocessor control board 51.

A pair of air switches 78 function as transducers. These are standard type air switches connected to respective air hoses placed across a carriage way. In each one a diaphragm actuates a piezo-electric crystal mounted thereon, to provide a pulse. Detailed descriptions can be found in U.S. Pat. No. 3,900,830.

The traffic monitoring interface board will accept the outputs from up to four separate traffic counting transducers at a time, and store the counts in separate respective counters. After the programmed number of system time intervals have occurred, the microprocessor collects the count from each of the counters, and stores them in the EPROM data memory. At the same time the counters are cleared, ready to receive the next lot of counts.

Each time the wheels of a vehicle run over the air hose associated with the transducer, a pulse is generated. This pulse is applied to a type 4024 counter in the traffic monitoring interface board, and increments the count by one. This goes on all the time the recorder is in operation even though the microprocessor may be turned off. At the required time, the microprocessor reads the value in the counter via a type 74C373 interface device 80, and immediately after this sends a control signal to reset the counter.

Figure 9:
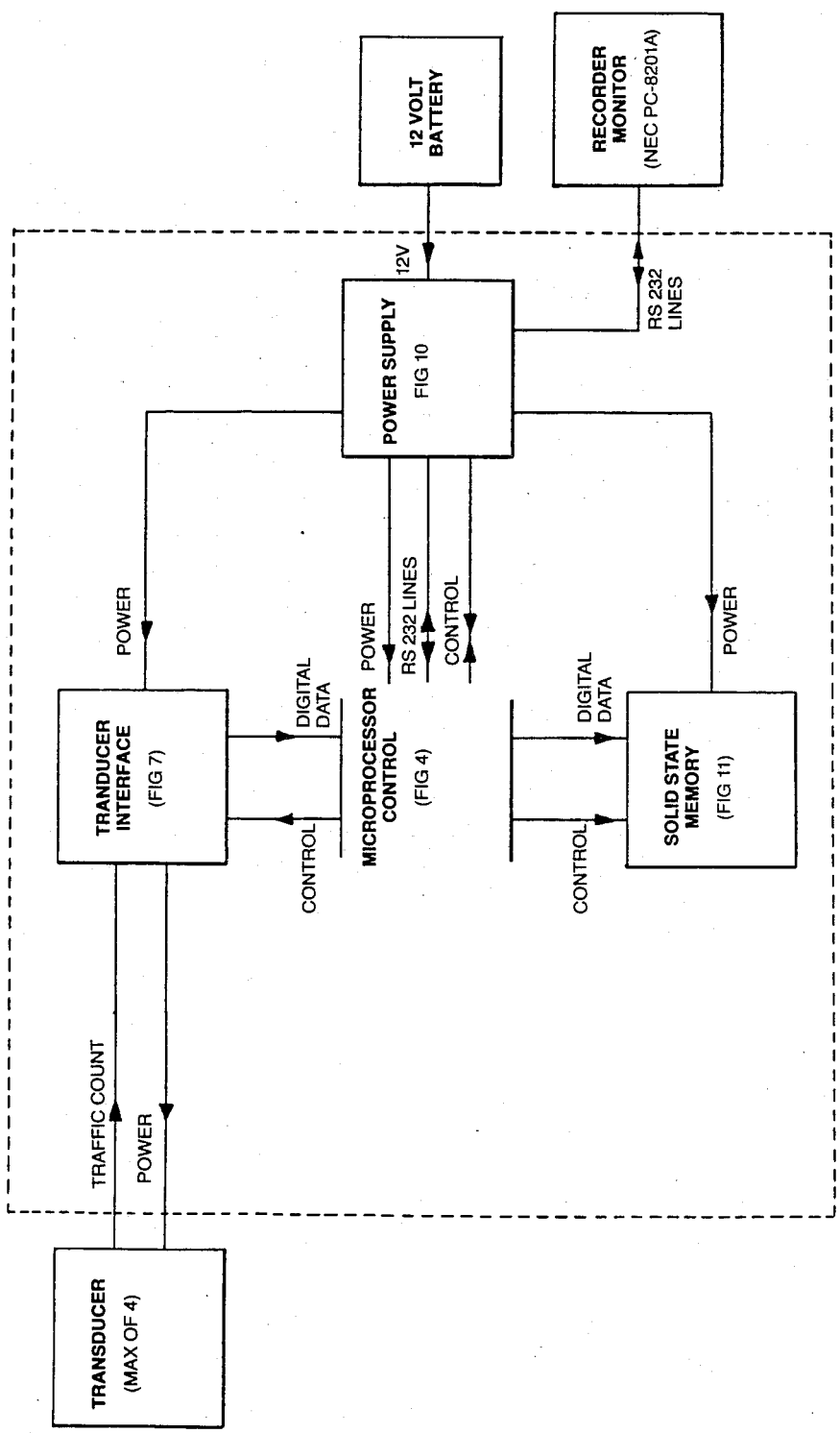
FIG. 9 is a block diagram of an electrical circuit for a traffic monitoring recorder unit according to a second embodiment wherein the keyboard display unit (Refer FIG. 1) is replaced by an external battery microcomputer, whilst

In the second embodiment of the invention illustrated in FIG. 9, the electrical circuit is essentially the same as that shown in FIG. 1. However, the keyboard-display unit is substituted by a recorder monitor which in this instance is a battery microcomputer sold under the proprietary name "NEC 8210A" (having a RS232 interface). The recorder unit of FIG. 9 has the advantage over the previously described unit in that it can be readily accessed, via conventional telephone lines, by virtually any computer having an RS232 interface.

Figure 3:
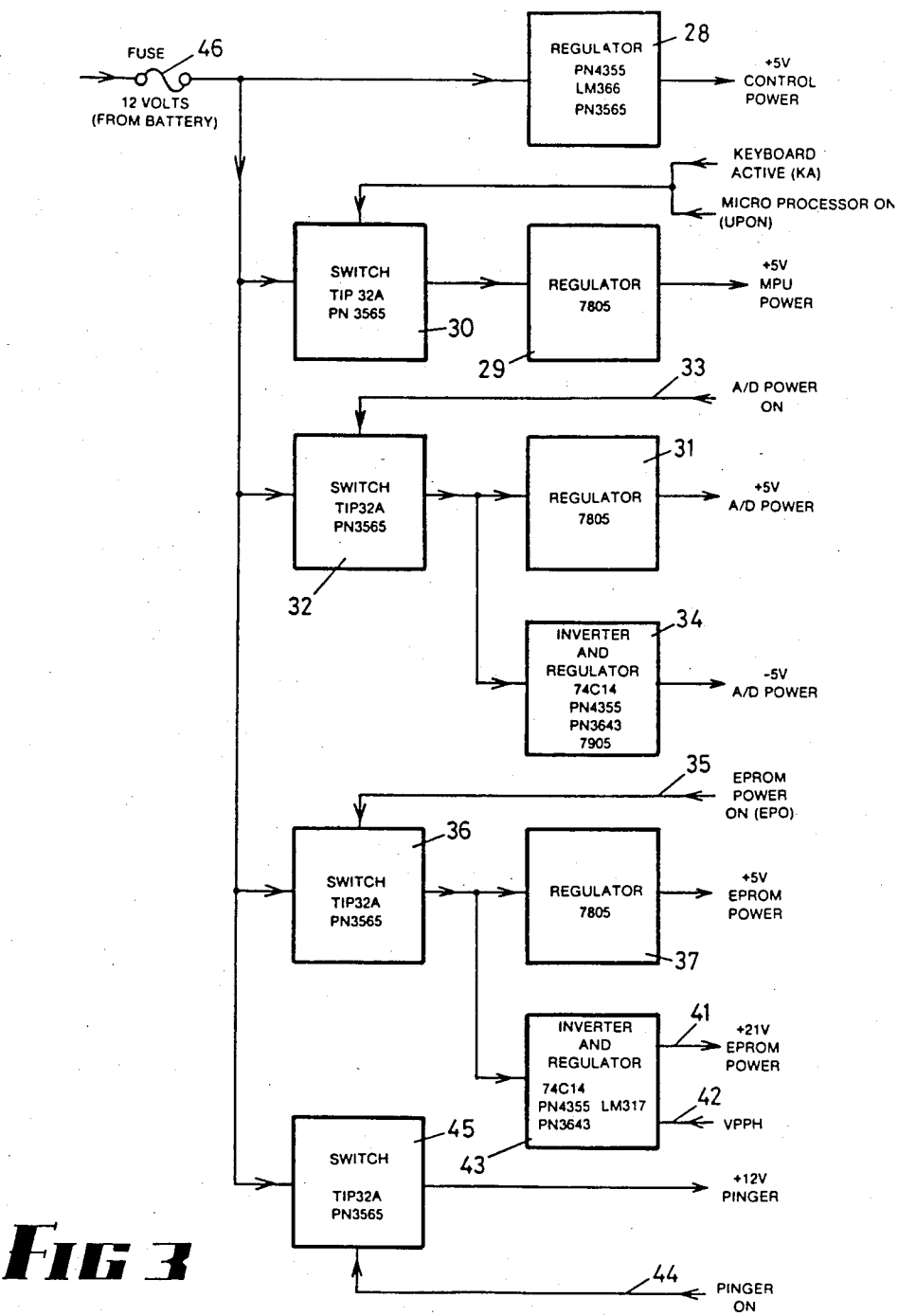
FIG. 3 is a block diagram showing the power supply.
Figure 10:
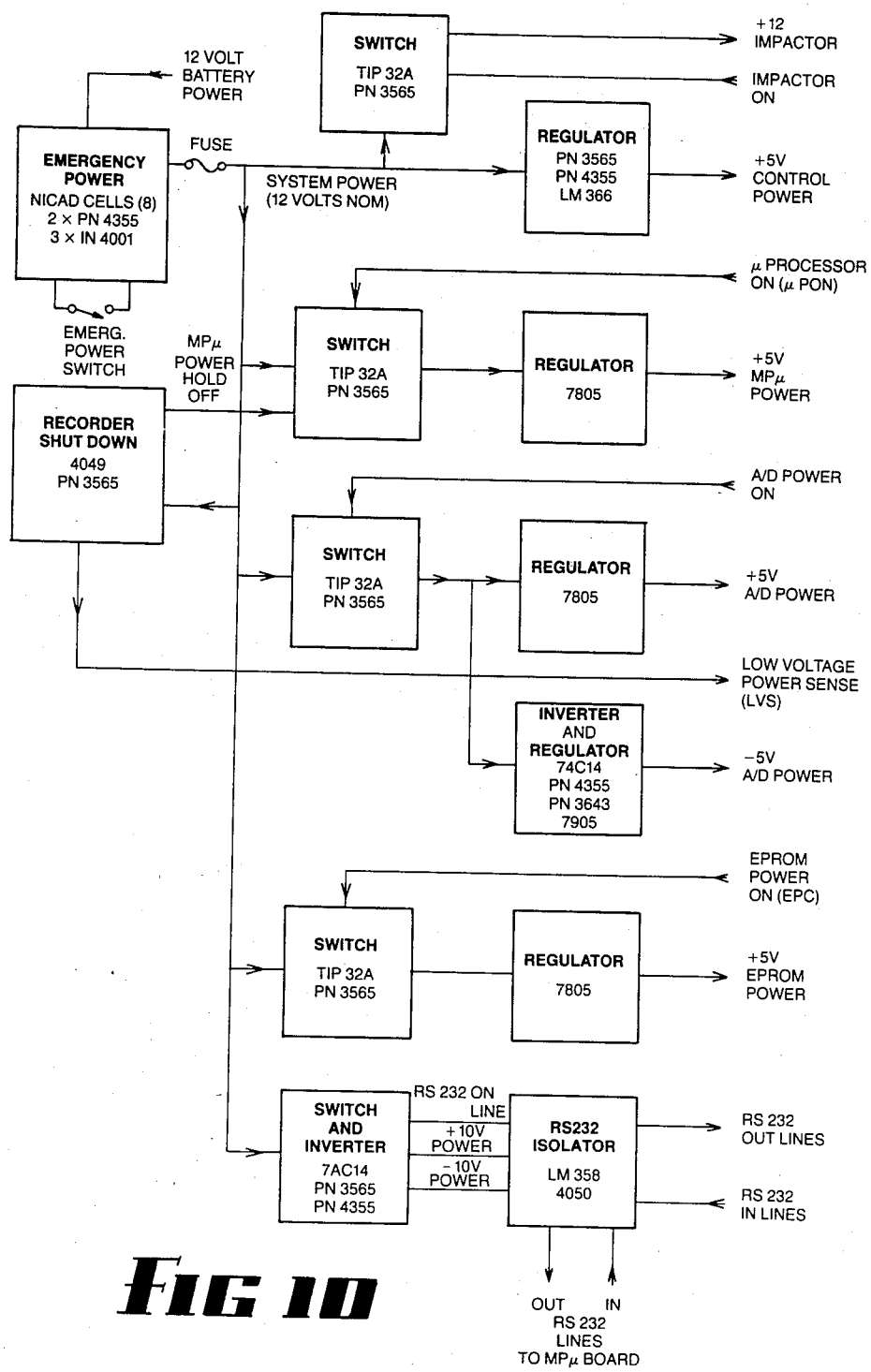

FIG. 10 illustrates the power supply board block diagram which corresponds very closely to that shown in FIG. 3 in respect of which a detailed description has already been given.

The components necessary to operate the RS232 interface are also mounted on the power supply board. These are divided into a number of sections as follows:

1. Input interface lines. These three signals (clear to send, data in, and data terminal ready) are isolated from the recorder by a type 4050 CMOS buffer, which is powered from the +5V MPU switched power line. This means that the outputs from the buffers will remain near zero volts unless the MPU power line (and hence the MPU itself) is active. The buffer inputs are isolated from the RS232 signals by 22k resistors, so nothing happens until the +5V MPU power is switched on.

The MPU control board monitors the DTR line after all it is required to do has been completed. If the DTR line is found low, then the MPU switches itself off, but not if the DTR line is found active. In this condition the recorder remains active and sends an acknowledgement message to the recorder monitor. The recorder monitor is then able to access the data recorder.

2. Output interface lines. These two lines are called data out, and request to send respectively. An LM358 (dual amplifier) is used to isolate these lines from the appropriate lines coming from the MPU control board. The power for the isolation amplifier comes from the RS232 power supply, and this means that these output lines will meet the RS232 specification of greater than +5 volts for "MARK" and less than −5 volts for "SPACE".

3. RS232 power supply. If the data terminal ready (DTR) line is active when the MPU Power line is switched on, the power supply for the RS232 output lines is turned on via a transistor switch. This provides a +10 volt unregulated power source. The −10 volt power is obtained from 74C14 oscillator driving a voltage doubler circuit connected to provide an output of about −10 volts. The +10 volt line is switched straight from the +12 volt system power.

As shown in FIG. 11 which illustrates the solid state memory board block diagram, use is made of an EEPROM solid state data memory in preference to an EPROM described in the first embodiment.

The solid state memory board contains a bank of six semiconductor solid state memory chips (EEPROMS) mounted in a detachable module. Each of these chips can store 1,000 four digit traffic count values (2,000 bytes). Thus a total of 6,000 traffic values can be stored on the module. Provision has been made to allow larger storage capacity chips to be inserted in to the module to increase its capacity from 6,000 values to 24,000 values.

The EPPROMS modules are erasable in the field by the use of the recorder monitor. However erasure while the recorder is operating is impossible and must be a deliberate act at other times. EEPROMS do not require any power to hold their data, and may be removed from the recorder for data reading at a computer terminal if desired.

The main part of the solid state memory board consists of a cradle to hold the removable module and two type NSC810 input/output devices for interfacing the module to the microprocessor control board. Control signals from the memory board are used by the power supply board to turn on the +5 volt EEPROM power, and other signals are used to read or write to the memory module. Note that like the transducer interface board, the solid state memory board can only be active while the microprocessor itself is functioning.

Normal power for the recorder comes from a 12 volt 8 amp hour battery pack. This may be unplugged from the recorder and replaced at any time without interfering with the recorder operation, provided the emergency power section on the power supply board is switched on. The battery pack is equipped with a voltmeter, which when activated by the push button, gives an indication of the charge remaining in the battery. A small circuit board is mounted on the back of the meter in order to expand the scale of meter from about 11.0 volts to 13.5 volts.

Figure 4:
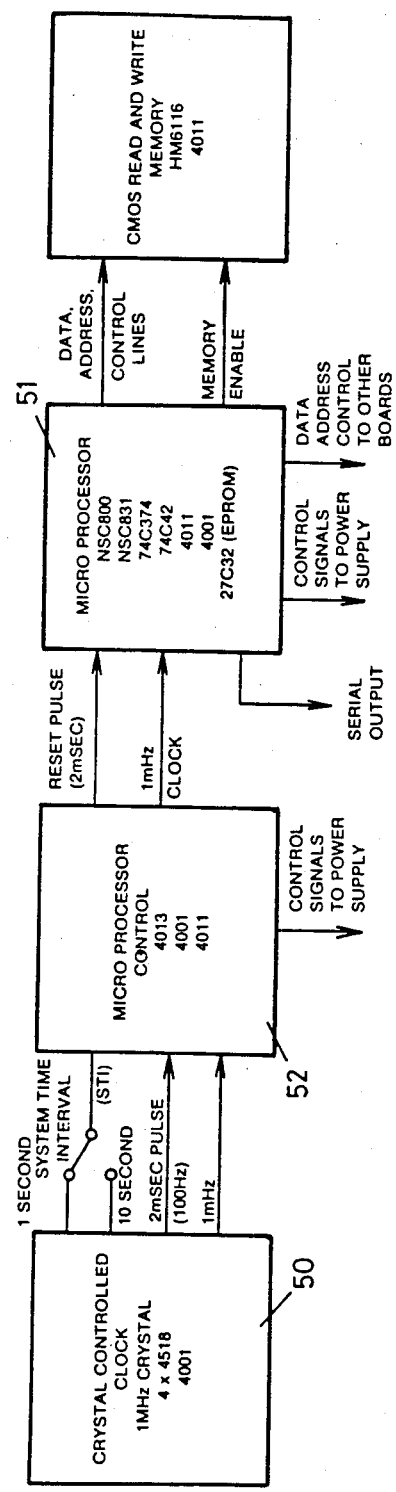
FIG. 4 is a block diagram of the microprocessor control board.

The recorder unit of FIG. 9 employs a microprocessor control board and a transducer interface board indentical to those shown in FIGS. 4 and 5 respectively.

The traffic monitoring interface board will accept the outputs from four separate traffic counting transducers at a time, and store the counts in four separate counters. After the programmed number of system time intervals have occurred, the microprocessor collects the count from each of the counters, and stores them in the EEPROM data memory. At the same time the counters are cleared, ready to receive the next lot of counts.

Each time the axle of a vehicle runs over the air hose associated with the transducer, a pulse is generated. This pulse is applied to a type 4024 counter in the traffic monitoring interface board, and increments the count by one. This goes on all the time the recorder is in operation even though the microprocessor may be turned off. At the required time, the microprocessor reads the value in the counter via a type 74C373 interface device, and immediately after this sends a control signal to reset the counter. Other CMOS logic devices are used for decoding and control purposes.

The recorder monitor is simply a battery operated microcomputer (NEC PC-8201A) equipped with an RS232 port. This means that other microcomputers (or terminals) equipped with RS232 ports, may be used as the monitor instead. However, for field use only the battery operated varieties are suitable.

To gain access to the recorder, the monitor sets the data terminal ready line (DTR) to the active state (that is between 5 and 15 volts positive). As an acknowledgement the recorder sends the ASCII "clear screen" character and the message "RECORDER READY". Since the DTR line is looped through the battery power plug, removing this power plug prevents the monitor gaining access to the recorder while it is operating on emergency power.

The recorder monitor can display the recorder parameters as well as change some of them. Some of the parameters that can be displayed are as follows:

1. period (PERD) in hours, minutes and seconds between times when the recorder stores data;
2. elapse time (ELAP) in hours, minutes and seconds since the recorder last stored data; and
3. the current time of day (TIME) and date (DATE).

The recorder monitor can also read the data out of the data memory module, and then erase it ready to accept the next lot of data. After the data has been read into the monitor, it can be held there for later transfer to a larger computer or displayed on the monitor for checking in the field. When satisfied that the data from the recorder has been transferred into the monitor, the monitor may then be used to erase (or clear) the data memory. Note that this has to be a deliberate act by the operator, and safeguards are built in to make accidental erasure virtually impossible.

It should of course be appreciated that the recorder monitor arrangement shown in FIG. 9 for traffic monitoring can be used for water level monitoring instead of the recorder unit of FIG. 1 which employs a keyboard display unit.

While the above description provides a full and complete description of the preferred embodiments of the present invention, various modifications, alternate constructions and equivalents may be employed. Therefore, the above description illustrations should not be construed as limiting the scope of the invention which is defined by the following claims.

What is claimed is:

1. A means for recording fluid levels by recording electrical signals comprising:
    a transducer;
    a transducer interface including a potentiometer and a master pulley on and coupled to the potentiometer, said transducer interface providing a signal that indicates an angular position of the potentiometer;
    a float for identifying a fluid level position;
    a tape having one end attached to the float and extending over the master pulley to a counterweight, means for attaching the other end of the tape to the counterweight;
    an impactor proximate said tape adapted to provide impact to the tape of sufficient magnitude that resultant movement and oscillation of the tape will overcome static friction in the transducer interface;
    a microprocessor that, when energized at preset system time intervals, interrogates said transducer interface, and transfers said dignal from said transducer interface into a solid state data memory; and
    a read-out means for reading and displaying said signal from said solid state data memory.

2. A means according to claim 1 wherein said impactor comprises a solenoid, which upon being energized, actuates a core to impact the tape.

3. A means according to claim 1 for feeding data from said solid state memory into said computer, and storing and analyzing said data in and by said computer.

4. A means for recording electrical signals according to claim 1 further comprising establishing said signal as a count of pulses during said system time interval.

5. A means for recording electrical signals according to claim 4, wherein said transducer comprises a pulse generating device, further comprising establishing a succession of said signals as a succession of counts of said pulses generated by actuation of said pulse generating device.

6. A means for recording electrical signals according to claim 5 wherein said transducer interface comprises a counter for establishing said count of pulses, and further comprising clearing said counter of said pulse signals upon each interrogation by said microprocessor.

7. A means according to claim 1, wherein said read-out means is selected from a group consisting of a keyboard-display unit, a computer and a printer.

* * * * *